(No Model.)
D. COCHRANE.
OIL AND STEAM SEPARATOR.
No. 557,108. Patented Mar. 31, 1896.
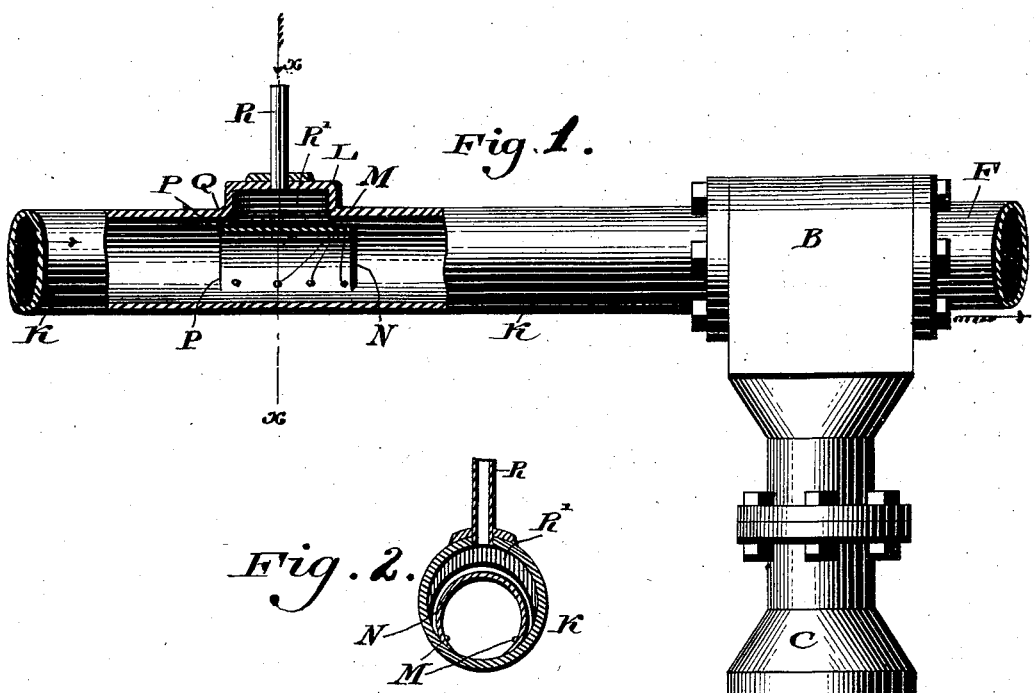
WITNESSES:
P. F. Nagle
L. Douville.
INVENTOR
David Cochrane
BY
ATTORNEY.

UNITED STATES PATENT OFFICE.

DAVID COCHRANE, OF PHILADELPHIA, PENNSYLVANIA, ASSIGNOR TO HARRISON SAFETY BOILER WORKS, OF SAME PLACE.

OIL AND STEAM SEPARATOR.

SPECIFICATION forming part of Letters Patent No. 557,108, dated March 31, 1896.

Application filed June 25, 1895. Serial No. 553,972. (No model.)

*To all whom it may concern:*

Be it known that I, DAVID COCHRANE, a citizen of the United States, residing in the city and county of Philadelphia, State of Pennsylvania, have invented a new and useful Improvement in Methods of and Apparatus for Separating Oil from Saturated or Superheated Steam, which improvement is fully set forth in the following specification and accompanying drawings.

My invention has relation to the separation of oil from steam, or any other liquid from a gaseous current, and is especially applicable for separating oil from exhaust-steam coming from a cylinder that is jacketed with steam at a higher temperature than the steam from the engine-cylinder.

Under the above conditions none of the separators in common use are able to separate the oil effectively from the steam, because the quantity of oil used for lubricating purposes is ordinarily so small in proportion to the amount of steam that the oil will adhere so closely to the different surfaces of the separator that it will travel along with the steam, so that there is ordinarily nothing tangible for the separator to get hold of or to act upon, and the consequence is that practically all the oil is found eventually commingled with the water collected from the condensed steam, thereby rendering the same unfit to be fed back again to the boilers, or for any other use where oil is objectionable or injurious, thereby entailing great loss to the user both of heat and water.

Steam coming from the cylinder under the conditions described is either saturated or slightly superheated, which means that there is nothing present in the exhaust-pipe but steam and oil, and I have found by experiment that by obtaining a small percentage of water within the steam-conduit—say about five per cent.—either by condensing part of the steam by cooling off the exterior of the exhaust-conduit before the same reaches the separator or by introducing substantially the same amount of water directly into the pipe or conduit in such a way that the greater part of it will come in contact with the inside surface of the pipe, so as to condense that portion of the steam directly in contact with said surface, this condensed steam or water so formed mixes with the oil and becomes commingled therewith, thereby destroying its adhesive qualities to a great extent, thereby giving a tangible body for the baffle-plates or obstructions within the separator to act upon, thus enabling any good separator to so purify steam after the same has been treated as above described that the water resulting therefrom is at once fit for use in a boiler, or for any other purpose for which condensed steam is applicable; and to this end my invention consists of a novel apparatus for treating exhaust-steam or superheated steam containing oil prior to the passage of the same through the separator, whereby a portion of the current of the incoming steam which is in contact with the inner face of the exhaust-steam pipe or conduit is cooled or condensed, this slight condensation which takes place thereby giving a tangible body to the current of exhaust-steam for the baffle-plates to act upon, thus enabling the oil in said steam to be readily and effectively separated therefrom.

It further consists of novel details of construction, all as will be hereinafter set forth.

Figure 1 represents a side elevation, partly in section, of an apparatus for separating oil from saturated or superheated steam embodying my invention. Fig. 2 represents a section on line $x$ $x$, Fig. 1.

Similar letters of reference indicate corresponding parts in both figures.

A designates an apparatus for carrying out my invention, the same consisting of a separator proper, B, which may be of any suitable construction, but is preferably constructed in accordance with prior patents granted to me in this same class of invention.

C designates a well or tank attached to the lower portion of the separator, the water, oil, &c., settling therein, being drawn off by any suitable drain-pipe.

F designates a discharge-pipe from the separator, and K the inlet-pipe therefor, which may be provided at any suitable point with an enlargement or swell L, the extent of which will be understood from Fig. 1, said pipe K having secured therein adjacent said swell, by means of the bolts or rivets M, the hollow partially-cylindrical shell N, whose edge P projects to such an extent that it is adjacent to or partly overhangs beyond the shoulder or ledge Q, a slight passage being thereby formed between the free end P of said shell and the interior of the pipe K at said point Q, whereby a chamber R' is formed between the shell M and the swell or enlargement L.

R designates an inlet-pipe for water, which may be provided with a suitable valve.

The operation is as follows: The water is introduced by means of the pipe R into the chamber R', thence into the interior of the pipe or conduit K, the water falling upon the shell N and dropping therefrom at about the point P, thereby condensing to a slight degree the incoming steam at points near the inner periphery of the conduit K, the oil being taken up by a slight precipitation of water from the condensed steam and being effectively separated from the steam in the separator B, as will be understood.

It will be evident from the foregoing that other means may be employed than those shown, whereby the outer portion of the current of steam is caused to slightly condense and thereby take up a slight percentage of oil, as described, for the separator to act upon, which will come within the scope of my invention, and I do not therefore desire to be limited in every instance to the exact construction I have herein shown and described.

Having thus described my invention, what I claim as new, and desire to secure by Letters Patent, is—

1. In combination with a separator, a steam-inlet pipe therefor, having secured to the interior thereof a curved or bent shell, one edge or portion of the latter being open to the incoming steam, and means for introducing water or other cooling medium into said steam-pipe, adjacent said shell, substantially as described.

2. In combination with a separator, the inlet-pipe K, having an enlarged portion L, a shell N secured within said pipe, thereby forming a chamber R', and means for conducting a cooling fluid into said chamber, substantially as described.

DAVID COCHRANE.

Witnesses:
JOHN A. WIEDERSHEIM,
E. H. FAIRBANKS.